United States Patent
Reial et al.

(10) Patent No.: US 10,516,991 B2
(45) Date of Patent: Dec. 24, 2019

(54) WIRELESS DEVICE, NETWORK NODE, AND METHODS AND COMPUTER PROGRAMS FOR THE SAME

(71) Applicant: Telefonaktiebolaget LM Ericsson (publ), Stockholm (SE)

(72) Inventors: Andres Reial, Malmö (SE); Joakim Axmon, Malmo (SE); Håkan B. Björkegren, Täby (SE); Gunnar Mildh, Sollentuna (SE); Johan Nilsson, Höllviken (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 128 days.

(21) Appl. No.: 15/538,486

(22) PCT Filed: Dec. 16, 2016

(86) PCT No.: PCT/EP2016/081486
§ 371 (c)(1),
(2) Date: Jun. 21, 2017

(87) PCT Pub. No.: WO2018/108290
PCT Pub. Date: Jun. 21, 2018

(65) Prior Publication Data
US 2018/0242142 A1 Aug. 23, 2018

(51) Int. Cl.
*H04W 8/24* (2009.01)
*H04W 88/06* (2009.01)
(Continued)

(52) U.S. Cl.
CPC ............. *H04W 8/245* (2013.01); *H04W 4/02* (2013.01); *H04W 8/005* (2013.01); *H04W 8/205* (2013.01);
(Continued)

(58) Field of Classification Search
CPC ..... H04W 8/245; H04W 8/205; H04W 8/005; H04W 88/06; H04W 4/02; H04W 64/003
See application file for complete search history.

(56) References Cited

U.S. PATENT DOCUMENTS

| 8,913,571 | B2 * | 12/2014 | Buda | ............... H04J 11/0069 370/329 |
| 2006/0003747 | A1 * | 1/2006 | Kolakowski | .......... H04W 48/10 455/414.1 |

(Continued)

FOREIGN PATENT DOCUMENTS

EP 2996394 A1 3/2016

*Primary Examiner* — Jamal Javaid
(74) *Attorney, Agent, or Firm* — Coats + Bennett, PLLC

(57) ABSTRACT

There is provided a method of a wireless terminal arranged to operate in a communication network including communication capabilities according to a first radio access technology, RAT, and a second RAT with the wireless terminal. The method comprises transmitting data to a network node of the communication network or connected to the communication network via a connection using the first RAT. The data enables the network node to determine information about a position of the wireless terminal. The method further comprises receiving a set of parameters from the network node via the connection using the first RAT. The set of parameters is related to any of cell search and system information search for the second RAT. The method further comprises performing cell search or system information search for the second RAT based on the set of parameters. A network node for providing the set of parameters is also disclosed, as well as such wireless device, network node, and computer programs for implementing the methods in such wireless device and network node.

10 Claims, 4 Drawing Sheets

(51) Int. Cl.

| | |
|---|---|
| *H04W 8/20* | (2009.01) |
| *H04W 4/02* | (2018.01) |
| *H04W 8/00* | (2009.01) |
| *H04W 64/00* | (2009.01) |
| *H04W 48/16* | (2009.01) |
| *H04W 48/14* | (2009.01) |

(52) U.S. Cl.
CPC ........... *H04W 48/14* (2013.01); *H04W 48/16* (2013.01); *H04W 64/003* (2013.01); *H04W 88/06* (2013.01); *H04W 64/00* (2013.01)

(56) References Cited

U.S. PATENT DOCUMENTS

2009/0104907 A1\* 4/2009 Otting .................. H04W 48/10
 455/435.3
2014/0075025 A1 3/2014 Stanforth et al.
2014/0307551 A1 10/2014 Forssell \* cited by examiner

WIRELESS DEVICE, NETWORK NODE, AND METHODS AND COMPUTER PROGRAMS FOR THE SAME

TECHNICAL FIELD

The present invention generally relates to methods of a wireless terminal and of a node of a communication network or connected to the communication network, such wireless terminal and node, and computer programs for the wireless device and node for implementing the methods. In particular, the invention relates to provision of a parameter set to the wireless device, which is assumed connected according to a first RAT, to facilitate search for cells and system information in another RAT.

BACKGROUND

In legacy cellular networks like GSM, WCDMA/HSPA, and LTE, one of the design objectives has been to make system information and reference symbols easily available to all User Equipments, UEs, in a broadcast manner. To take the example of LTE, Physical Broadcast Channel, PBCH, continuously transmits system information over the entire cell coverage area, and Synchronization Channel, SCH, and Cell-specific Reference Signal, CRS, are provided constantly over the same area to allow synchronization, channel characterization, and phase reference estimation.

In coming fifth generation, 5G, network deployments whose standardization has recently started, various significant design changes are expected. To provide sufficient link quality at higher frequency bands, large antenna arrays and high-gain beamforming will be employed. To improve network energy efficiency, reduce interference, increase capacity, and ensure forward compatibility, common information broadcast will be minimized. We anticipate that only minimal system information, enough to perform initial system access, will be broadcasted; all additional System Information, SI, will be delivered to individual UEs in a dedicated manner, utilizing beamforming. To the same end, the amount of always-on synchronization and reference signals will be minimized and in cases they are needed, their repetition period will be made as long as possible. No LTE CRS-like signals are expected. Instead, Demodulation Reference Signal, DMRS, will be used for demodulation purposes and different signals to be detected, e.g. for mobility, are only activated when needed and will be self-contained, including sync features.

From these observations, there is a forecast that searching for reference signals when trying to connect to such a system may be troublesome due to the scarce provision of reference signals when the wireless device has no knowledge about transmissions in the new RAT.

SUMMARY

The invention is based on the inventors' realization that the lack of knowledge about transmissions in a RAT to be searched may be alleviated by that a wireless device can be provided with information over a first RAT, to which a connection is already established, for searching cells or system information in another RAT. In particular, the realization is about that the information is based on a position of the wireless device.

According to a first aspect, there is provided a method of a wireless terminal arranged to operate in a communication network including communication capabilities according to a first radio access technology, RAT, and a second RAT with the wireless terminal. The method comprises transmitting data to a network node of the communication network or connected to the communication network via a connection using the first RAT. The data enables the network node to determine information about a position of the wireless terminal. The method further comprises receiving a set of parameters from the network node via the connection using the first RAT. The set of parameters is related to any of cell search and system information search for the second RAT. The method further comprises performing cell search or system information search for the second RAT based on the set of parameters.

The transmitting of data to the network node may comprise transmitting positioning information for the wireless terminal, or transmitting arbitrary information, wherein the network node is capable of estimating a position of the wireless terminal from received signals.

The method may comprise selecting a subset of the parameters of the set of parameters which subset of parameters are applicable for the wireless device. The parameters may be considered applicable for the wireless device based on any of agreement with subscription associated with the wireless device, access enabled by the wireless device, and capabilities of the wireless device.

The performing of cell search may be performed based on parameters indicating duration or map of measurements on a cell.

The parameters may indicate any of occupied carriers, associated RAT, Public Land Mobile Network, PLMN, code, bandwidth, system information location in transmission, and system information repetition pattern or period in transmission, of the second RAT.

The method may include making adaptations to the parameters to succeed in finding a cell or system information, and transmitting an adapted set of parameters to the network node, wherein the adapted set of parameters provided success in finding any of the cell or system information. The parameters of the adapted set of parameters may indicate any of occupied carriers, associated RAT, Public Land Mobile Network, PLMN, code, bandwidth, system information location in transmission, and system information repetition pattern or period in transmission, of the successful finding of the cell or system information of the second RAT.

According to a second aspect, there is provided a computer program comprising instructions which, when executed on a processor of a wireless device, causes the wireless device to perform the method according to the first aspect.

According to a third aspect, there is provided a method of a node of a communication network or connected to the communication network including communication capabilities according to a first radio access technology, RAT, and a second RAT with a wireless terminal operating in the communication network. The method comprises acquiring information about a position of the wireless terminal using the first RAT, accessing a database by the information about the position of the wireless terminal to achieve a set of parameters related to any of cell search and system information search for a connection using the second RAT at a position at least in vicinity of the position indicated by the information about the position, and transmitting at least a part of the set of parameters to the wireless terminal via the connection using the first RAT.

The method may further comprise, after the at least a part of the set of parameters are transmitted to the wireless terminal, receiving information from the wireless terminal about an adapted set of parameters related to any of cell search or system information search used by the wireless terminal, and storing at least a part of the adapted set of parameters in the database together with the information about the position of the wireless terminal.

The method may further comprise acquiring information about capabilities of the wireless terminal for operating with the second RAT, wherein the accessing of the database or the transmitting of the at least part of the set of parameters includes taking the capabilities into account such that the achieved set of parameters is applicable for the wireless terminal. The acquiring of information about capabilities of the wireless terminal may include receiving information from the wireless terminal about the capabilities, or accessing a second database holding information about capabilities.

The parameters may indicate duration or map of measurements on a cell.

The parameters may indicate any of occupied carriers, associated RAT, Public Land Mobile Network, PLMN, code, bandwidth, system information location in transmission, and system information repetition pattern or period in transmission, of the second RAT.

According to a fourth aspect, there is provided a computer program comprising instructions which, when executed on a processor of a network node, causes the network node to perform the method according to the third aspect.

According to a fifth aspect, there is provided a network node of a communication network or connected to the communication network including communication capabilities according to a first radio access technology, RAT, and a second RAT with a wireless terminal operating in the communication network, wherein the network node is arranged to perform the method according to the third aspect.

The network node may comprise a radio access network node of the communication network, a core network node of the communication network, or a server node connected to the communication network.

According to a sixth aspect, there is provided a wireless device arranged to operate in a communication network including communication capabilities according to a first radio access technology, RAT, and a second RAT with the wireless terminal, and the wireless device (500) is arranged to perform the method according to the first aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
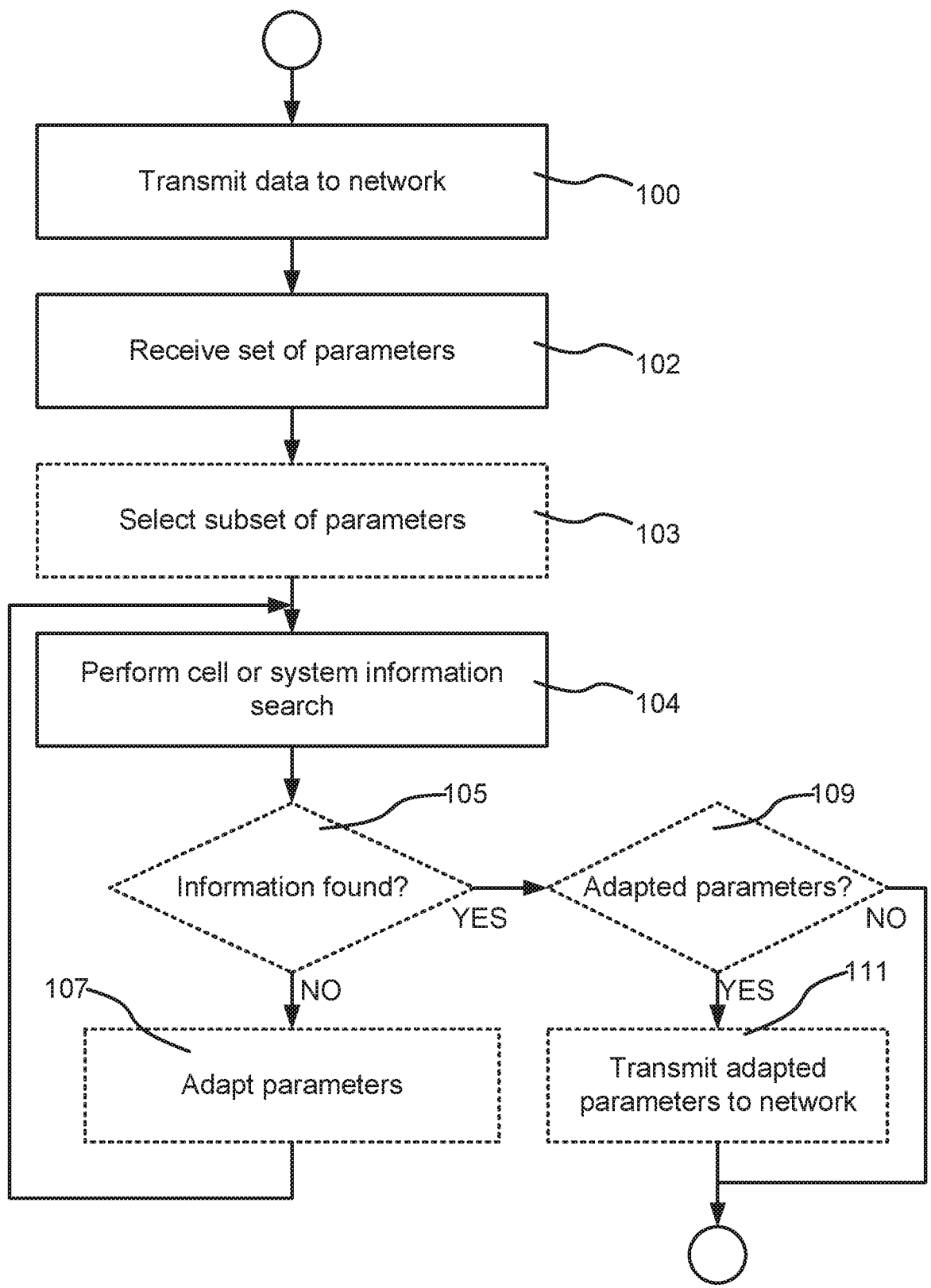
FIG. 1 is a flow chart schematically illustrating a method of a wireless device according to an embodiment.

In the disclosure below, the term "a network node" should in its functional meaning, i.e. when related to actions and logic, be interpreted as "at least one network node". For example, the function and action may for example be suitably divided between an access network node and a server node, which server node in turn may be implemented as one or more network nodes arranged according to what is popularly referred to as "cloud" technology. Thus, the "network" should in this context be interpreted as "one or more interconnected networks", for example an access network, a core network and the Internet, and possibly one or more server networks. Due to the inclusion of a wireless device in the approach, the access network is preferably a radio access network operating according to one or more radio access technologies, RATs. Thus, "the network node" is the node where the indicated function or action is performed while the node may be in connection with the wireless terminal directly over a radio interface and/or via one or more network nodes conveying information them between.

An aim of the approach demonstrated below is to provide, using a first radio access technology, RAT, on which a wireless device is assumed to communicating already, parameters for searching cells or system information for a second RAT such that the searching is improved. The searching can thus be based on those parameters. For example, for cell searching, the parameters may be indicating duration or map of measurements on a cell, or other indications for improving the ability to make efficient cell searching. Similar indications for searching for system information can also be provided. In general, the parameters may for example indicate any one or more of occupied carriers, associated RAT, Public Land Mobile Network, PLMN, code, bandwidth, system information location in transmission, and system information repetition pattern or period in transmission, which parameters are applicable for the second RAT at the given position.

In brief, the approach may be implemented as a user plane service, e.g. via an app, or a non-standardized service provided by the network. The assistance information may indicate an environment description category, e.g. one of several predefined band occupancy patterns, dense or sparse deployment, high or low dispersion, tight, loose, or no inter-node synchronization, etc. Alternatively, it may provide explicit relevant parameters, e.g. occupied carrier frequencies and respective RATs and PLMNs, average or maximal ISD, average or maximal channel delay spread, average or maximal inter-node timing misalignment, etc.

Some examples of transceiver operation aspects that may be adapted based on the obtained information are initial cell search frequencies and raster, neighbour cell measurement rates, synchronization search range in time, etc.

The approach aims to make wireless device access and mobility procedures more efficient by providing the wireless device with deployment information and/or the preferred search and measurement configurations without burdening the network with broadcast information transmission beyond the minimal required for basic system access functions.

The approach may be executed while the wireless device is in the active mode in some RAT and a communication link with the network is available to communicate with the central node. Information pertaining to operation in idle more or another low-power state is requested before the wireless device enters the idle mode, but applied when the wireless device is in the idle mode.

FIG. 1 is a flow chart schematically illustrating a method of a wireless device according to embodiments. The wireless device transmits 100 data to a network node via a connection using the first RAT, wherein the data enables the network node to determine information about a position of the wireless terminal. The data can for example comprise explicit information about the position. Alternatively, the data is any data, wherein the network node can determine the position from information available in the radio access network, e.g. information about cell, beam, time of arrival, and/or any of these from multiple radio access nodes. Either position determination approach is feasible, and it is advised to use whichever approach which is suitable for the actual setup. The information about the position enables the network node to determine a suitable parameter set for the actual position of the wireless device about a second RAT, as will be further discussed below.

The wireless device receives 102 a set of parameters from the network node via the connection using the first RAT. The set of parameters is related to any of cell search and system information search for the second RAT. Optionally, the wireless device may select 103 a subset of the set of parameters, e.g. based on information which was not known by the network node such as capabilities of the wireless device, agreement with subscription associated with the wireless device, access enabled by the wireless device, etc. The set of parameters, or selected subset of the parameters, is used by the wireless device to perform 104 cell search or system information search using the second RAT. If the desired search is successful (105, YES; 109, NO), the task is fulfilled. However, if the desired search is not successful (105, NO), the wireless device may adapt 107 the parameters, aiming to improve probability of successful search, and redo 104 the search. In such case, when search considered successful (105, YES) with the adapted parameters (109, YES), the wireless device may transmit 111 the adapted parameters associated with the actual position to the network node, wherein the network node is enabled to populate a database with the adapted parameters for later provision of a parameter set for the position.

Figure 2:
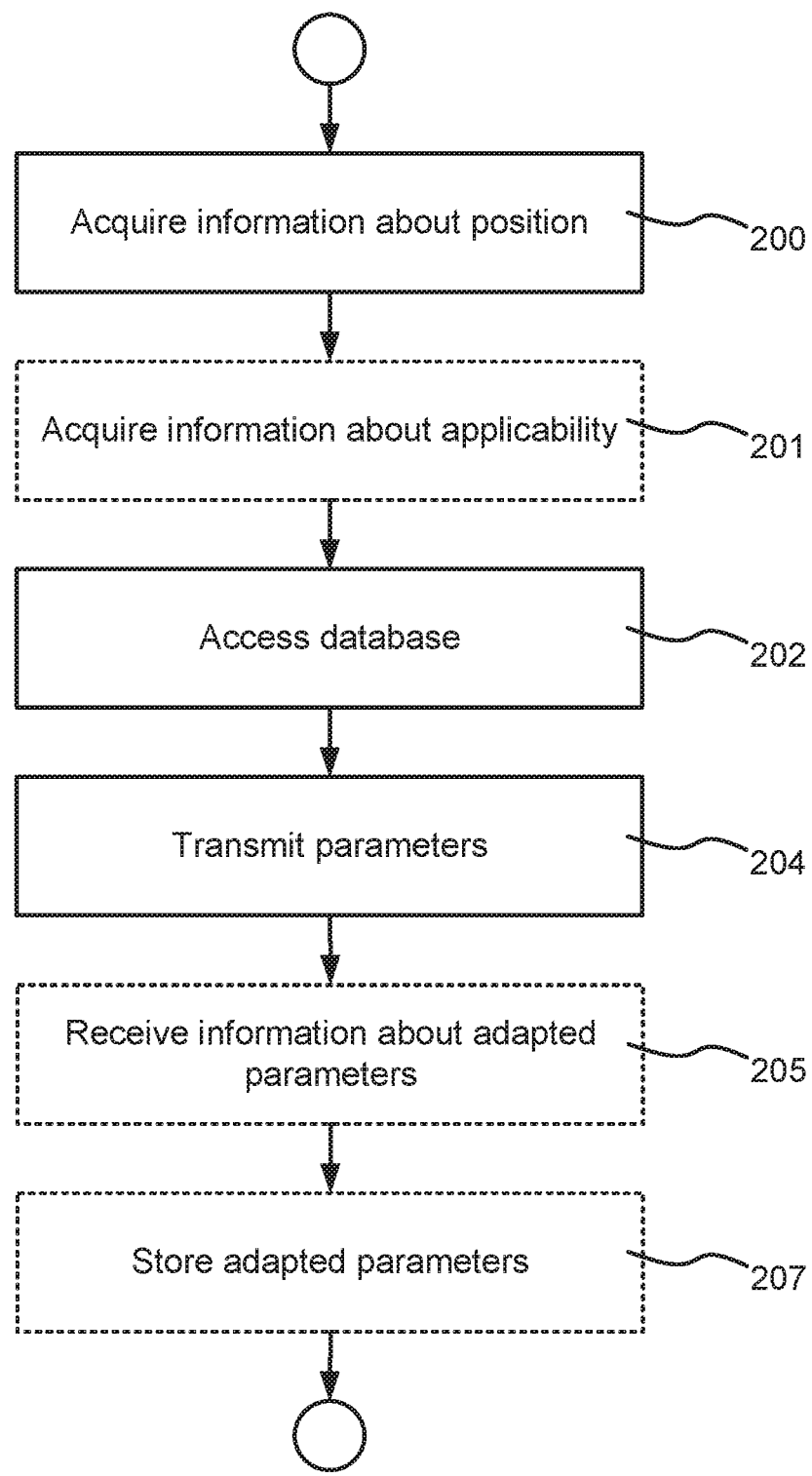
FIG. 2 is a flow chart schematically illustrating a method of a network node according to an embodiment.

FIG. 2 is a flow chart schematically illustrating a method of a network node according to embodiments. The functionality of the network node may, as demonstrated above, be located in one or more network nodes of different types. The network node acquires 200 information about position of a wireless device. The acquiring 200 of the position may be as demonstrated above, i.e. explicitly given by the wireless device or estimated by one or more nodes, possibly including the network node itself. Optionally, the network node acquires 201 information about applicable parameters, e.g. based on agreement with subscription associated with the wireless device, access enabled by the wireless device, capabilities of the wireless device, etc. This may be made from explicit reporting from the wireless device or by looking up information kept about the wireless device, e.g. in the network node itself or another node connected via one or another network.

Based on the acquired position information, and possibly the applicability information, about the wireless device, a database is accessed 202 to achieve a set of parameters related to any of cell search and system information search for a connection using the second RAT at a position at least in vicinity of the position indicated by the information about the position, and possibly matched to the applicability information of the wireless device. The determined set of parameters from the database is transmitted 204 to the wireless device over radio interface and/or via one or more network nodes conveying information them between.

As demonstrated above, the wireless device may adapt parameters to achieve successful search, and upon successful search report the adapted parameters to the network node. Thus, the network node may receive 205 information about the adapted parameters and then store 207 the adapted parameters together with information about the position, and possibly together with information about the wireless device, i.e. applicability information.

Here, the accessing and storing related to the database may include one or more databases. The database structure may be chosen to be suitable to structure of network nodes, information handling, access possibilities between nodes, etc. The database structure may be part of what is popularly referred to as "cloud" technology.

According to one example, an initial cell/system search is considered where the essential deployment information refers to e.g. used carriers, RATs, synchronization signal configurations, etc. that informs the UE about where and how long to search. The wireless device is connected to the central node using some established RAT, i.e. the first RAT, and obtains information that facilitates searching for additional carriers or RATs. For example, the wireless device may be connected via 4G RAT in 4 GHz band and obtains assistance information that aids searching 5G carriers in 28-60 GHz bands.

In this example, the wireless device receives a deployment information a list of occupied carriers, for example defined by EUTRA Absolute Radio Frequency Channel Number, EARFCN, and optionally one or more of the associated RAT, PLMN code, bandwidth, system info location, system information repetition period, etc. The reported deployment parameters may be based on reports from other wireless devices which have previously been active in the area and found these carriers with associated parameters.

The parameters are used by the wireless device to configure the initial cell search, e.g. RAT scan, in its geographical location. The wireless device will focus on testing the carrier and system information locations reported, while skipping unused frequencies. The wireless device may limit its search to carriers that have a PLMN code with which the wireless device has a contract or a roaming agreement. The wireless device may also adapt its search window in time at the specific carriers to ensure that it covers the system information repetition period, but not excessively more than that.

According to one example, active mode mobility measurements are assumed where the essential information refers to e.g. node/site placement and inter-site synchronization information that allows making the inter-cell measurement process more efficient. The wireless device may be connected to a central radio access node via a certain RAT and obtains information that facilitates mobility measurements in the same RAT.

In this example, the wireless device may receive deployment information comprising timing misalignment information. Previous wireless devices which have operated in the network acquire downlink timing alignment with regard to different radio access nodes and timing misalignment between individual pairs of nodes can therefore be estimated. The reports of the wireless devices, e.g. typical or worst-case detected offsets, are provided to the central node. Another wireless device can receive this assistance information from the central node and limit its timing synchronization search to a window that does not exceed the expected misalignment.

In a special case, the wireless devices may report back to the central node the actual values of timing offsets between specific node pairs, or absolute node timings based on. e.g. a Universal Time Coordinated, UTC, reference. When another wireless device receives this information from the central node, that wireless device can avoid explicit timing synch search, or at least narrow the search window significantly.

The wireless device may also receive deployment information comprising Inter-Site Distance, ISD, or candidate cell search/measurement rates. Wireless devices may report how often they detect new cells when moving at certain vehicular speeds. The normalized cell detection rate may be used to characterize the density of the deployment. The database may then be used to inform the wireless device about recommended search rate, which may be scaled according to vehicular movement, cell density, or deployment category, which may be one of a limited number of classifications.

The central node database may store average characteristics, typical, or extreme values for the deployment descriptors of interest. For example, the worst-case inter-node timing misalignment or average misalignment may be stored.

The parameters are used by the wireless device to configure the mobility measurements in its geographical location. The wireless device can adjust the rate of inter-cell measurements based on the obtained ISD information and estimated vehicular speed, the search window of time synchronization based on the obtained timing misalignment info, etc.

According to one example, a third-party application operating over the user plane may act as the central node. A client app in the wireless device retrieves layer 1, L1, or other low-level information and conveys it to a server application that manages a database. The same client-server setup manages assistance requests from wireless devices. The app at the wireless device now provides the deployment info back to the L1 algorithms. The app may be available for any wireless device from ordinary app distribution sites and may aggregate preferred deployment information for multiple networks and/or operators in a region.

According to one example, the central node is a node or other control unit in the cellular network. The network thus manages the reception of observations on deployments from wireless devices in the network, the database, and the assistance information distribution to wireless devices. The assistance service may be an add-on service that users can purchase from e.g. the network operator. Furthermore, the network may make additional deployment information available that is not based on reports from wireless devices, e.g. that the location corresponds to a hotspot, sparse macro, at sea, etc.

The database may constitute a specific file and data management and search software on a specific server located at, and/or controlled by, the provider of the assistance service. Alternatively, it can constitute a database service in a cloud that the provider of the assistance service accesses via a separate interface.

According to one example, wireless devices operating in device-to-device, D2D, mode may use the sidelinks to request and provide the assistance information. A wireless device seeking assistance information may send a request that other wireless devices in the vicinity respond to, without maintaining a centralized database. This approach may thus be logically similar to the central node embodiment above, where the wireless device sends requests and own deployment reports and receives deployment suggestions. It is not transparent L1-wise, though, since sidelink communication is different from UL/DL, communications, so adaptions are made accordingly.

In the examples above, the term "central node" has been used to denote the one or more nodes providing the parameter information demonstrated above.

Figure 3:
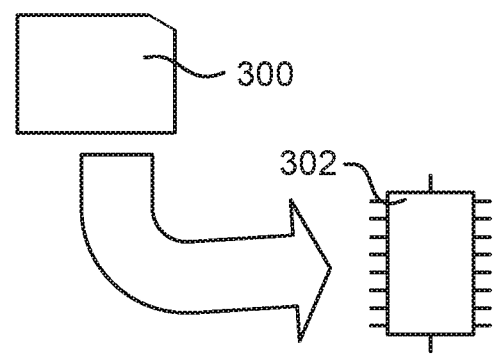
FIG. 3 schematically illustrates a computer-readable medium and a processing device.

The methods according to the present invention is suitable for implementation with aid of processing means, such as computers and/or processors, especially for the case where a processing elements 405, 412, 508 demonstrated below comprises a processor handling the provision of parameters and using/updating of the parameters, respectively. Therefore, there is provided computer programs, comprising instructions arranged to cause the processing means, processor, or computer to perform the steps of any of the methods according to any of the embodiments described with reference to FIGS. 1 and 2. The computer programs preferably comprises program code which is stored on a computer readable medium 300, as illustrated in FIG. 3, which can be loaded and executed by a processing means, processor, or computer 802 to cause it to perform the methods, respectively, according to embodiments of the present invention, preferably as any of the embodiments described with reference to FIGS. 1 and 2. The computer 302 and computer program product 300 can be arranged to execute the program code sequentially where actions of the any of the methods are performed stepwise, but may as well operate on a real-time basis. The processing means, processor, or computer 302 is preferably what normally is referred to as an embedded system. Thus, the depicted computer readable medium 300 and computer 302 in FIG. 3 should be construed to be for illustrative purposes only to provide understanding of the principle, and not to be construed as any direct illustration of the elements of the wireless device and network node, respectively.

Figure 4:
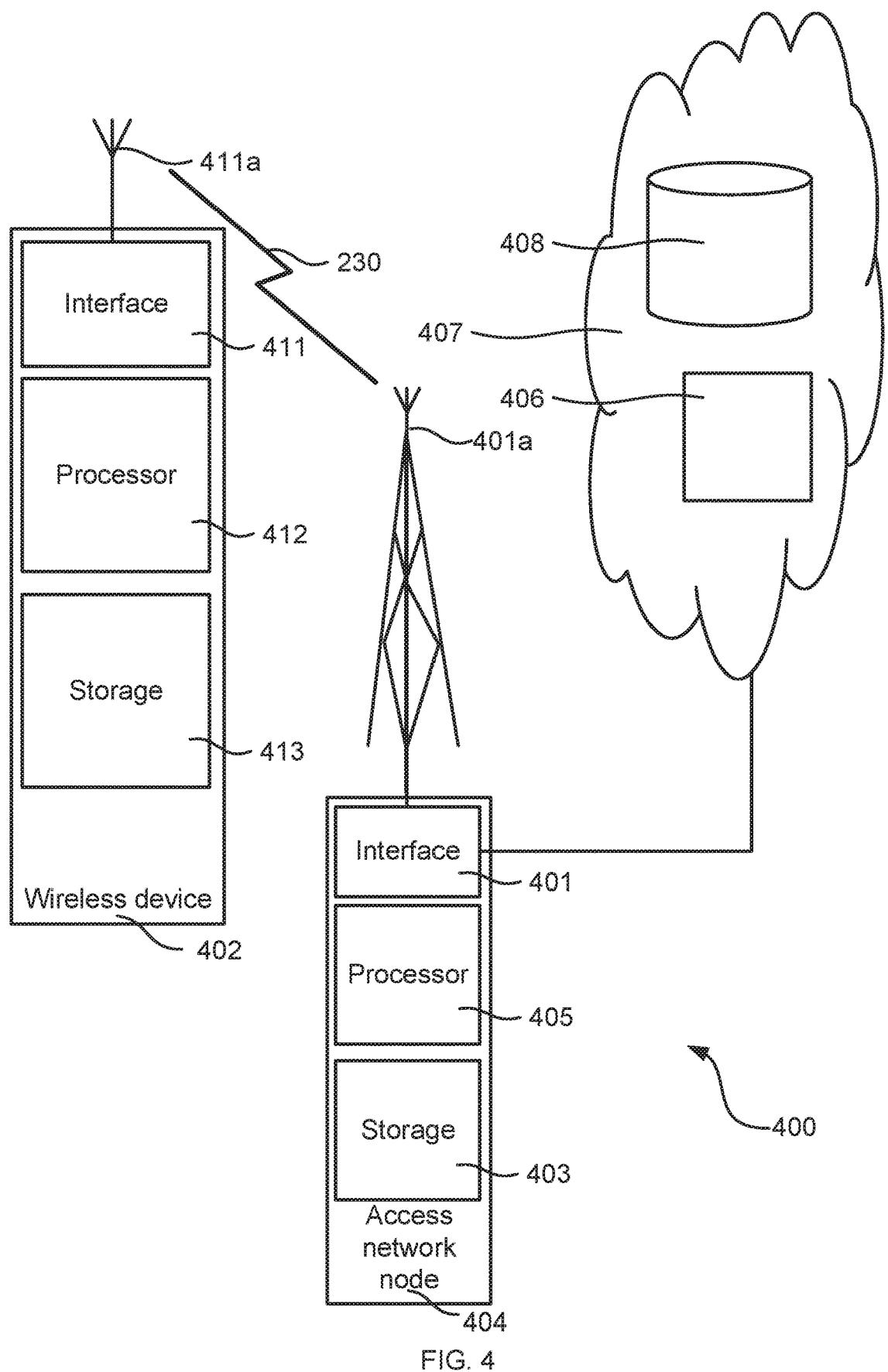
FIG. 4 schematically illustrates a network according to an embodiment.

FIG. 4 illustrates a wireless network comprising a more detailed view of an access network node 400 of an access network, a wireless device 402, and one or more connected networks 407, for example including a core network 406 and a server network 408. The access network node 400 is illustrated to comprise a processor 405, storage 403, interface 401, and antenna 401*a*, the latter indicating that the access network node is a node of radio access network. Nodes of other networks 406, 408 may similarly comprise a processor, interface and storage similar to the access network node 400. Similarly, the communication device 402 comprises processor 412, storage 413, interface 411 and antenna 411*a*. These components may work together in order to provide network node and/or wireless device functionality. In different embodiments, the network may comprise any number of wired or wireless networks, network nodes, base stations, controllers, wireless devices, relay stations, and/or any other components that may facilitate or participate in the communication of data and/or signals whether via wired or wireless connections.

The aggregated network, i.e. the access network and connected networks 407 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The components of the access network node 400, i.e. processor 405, storage 403, interface 401, and antenna 401*a*, are depicted as single boxes located within a single larger box. In practice however, a network node may comprise multiple different physical components that make up a single illustrated component (e.g., interface 401 may comprise terminals for coupling wires for a wired connection and a radio transceiver for a wireless connection). Similarly, access network node 400 may be composed of multiple physically separate components (e.g., a NodeB component and a RNC component, a BTS component and a BSC component, etc.), which may each have their own respective processor, storage, and interface components. In certain scenarios in which access network node 400 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node, in some embodiments, the access network node 400 may be configured to support multiple RATs, i.e. the first RAT and the second RAT. In such embodiments, some components may be duplicated (e.g., separate storage 403 for the different RATs) and some components may be reused (e.g., the same antenna 401*a* may be shared by the RATs).

The elements 401, 403, 405 described here also apply for other network nodes of the connected one or more networks 407.

The processor 405 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node components, such as storage 403 or other network node functionality. For example, the processor 405 may execute instructions stored in the storage 403. Such functionality may include providing various wireless features discussed herein to wireless devices, including any of the features or benefits disclosed herein.

The storage 403 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. The storage 403 may store any suitable instructions, data or information, including software and encoded logic, utilized by the access network node 400. The storage 403 may be used to store any calculations made by processor 405 and/or any data received via the interface 401.

The access network node 400 also comprises an interface 401 which may be used in the wired or wireless communication of signalling and/or data between the access network node 400, the connected one or more networks 407, and/or the wireless device 402. For example, the interface 401 may perform any formatting, coding, or translating that may be needed to allow the access network node 400 to send and receive data from the connected one or more networks 407 over a wired connection. The interface 401 may also include a radio transmitter and/or receiver that may be coupled to or a part of antenna 401*a*. The radio may receive digital data that is to be sent out to other network nodes or wireless devices via a wireless connection. The radio may convert the digital data into a radio signal having the appropriate channel and bandwidth parameters. The radio signal may then be transmitted via antenna 401*a* to the appropriate recipient (e.g., the wireless device 402).

The antenna 401*a* may be any type of antenna capable of transmitting and receiving data and/or signals wirelessly. In some embodiments, the antenna 401*a* may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

The wireless device 402, may be any type of communication device, wireless device, UE, D2D device or ProSe UE, but may in general be any device, sensor, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine to machine (M2M) communication, etc., which is able to wirelessly send and receive data and/or signals to and front a radio access network node, such as access network node 400 and/or other wireless devices. The wireless device 402 will be further described below with reference to FIG. 5, but in brief the wireless device 402 comprises a processor 412, storage 413, one or more interfaces 411, and one or more antennas 411*a*. Like the access network node 400, the components of the wireless device 410 are depicted as single boxes located within a single larger box, however in practice a wireless device may comprises multiple different physical components that make up a single illustrated component (e.g., storage 413 may comprise multiple discrete microchips, each microchip representing a portion of the total storage capacity).

The processor 412 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other components of the wireless device, such as storage 413 or other functionality of the wireless device. Such functionality may include providing various wireless features discussed herein, including any of the features or benefits disclosed herein.

The storage 413 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage 413 may store any suitable data, instructions, or information, including software and encoded logic, utilized by the wireless device 402. The storage 413 may be used to store any calculations made by the processor 412 and/or any data received via the interface 411.

The interface 411 may be used in the wireless communication of signalling and/or data between the wireless device 402 and the access network node 400, and thus with other network nodes via the access network node 400. For example, the interface 411 may perform any formatting, coding, or translating that may be needed to allow the wireless device 402 to send and receive data from or via the access network node 400 over a wireless connection. The interface 411 may also include a radio transmitter and/or receiver that may be coupled to or a part of antenna 411*a*. The radio transmitter may convert the digital data into a radio signal having the appropriate channel and bandwidth parameters. The radio signal may then be transmitted via antenna 411*a* to the access network node 400.

The antenna 411*a* may be any type of antenna capable of transmitting and receiving data and/or signals wirelessly. In some embodiments, the antenna 411a may comprise one or more omni-directional, sector or panel antennas operable to transmit/receive radio signals between 2 GHz and 66 GHz. For simplicity, the antenna 411a may be considered a part of the interface 411 to the extent that a wireless signal is being used.

Figure 5:
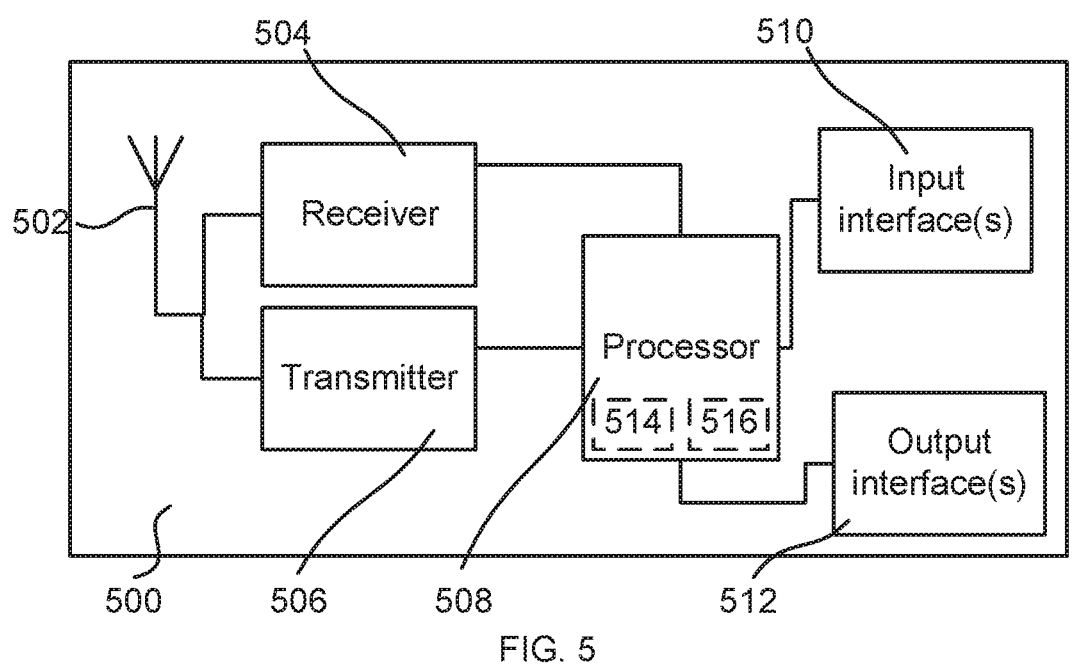
FIG. 5 is a block diagram schematically illustrating a wireless device according to an embodiment.

FIG. 5 is a block diagram schematically illustrating a wireless device 500 according to an embodiment. The wireless device 500, e.g. a UE, comprises an antenna arrangement 502, a receiver 504 connected to the antenna arrangement 502, a transmitter 506 connected to the antenna arrangement 502, a processing element 508 which may comprise one or more circuits including memory 514 and communication controller 516, one or more input interfaces 510 and one or more output interfaces 512. The communication controller 516 is arranged to operate with radio circuits, i.e. the receiver 504 and the transmitter 506, and may control the operation of the radio circuits, e.g. for the cell or system information searching. The interfaces 510, 512 can be user interfaces and/or signal interfaces, e.g. electrical or optical. The wireless device 500 is arranged to operate in a cellular communication network. In particular, by the processing element 508 being arranged to perform the embodiments demonstrated with reference to FIG. 1, the wireless device 500 is capable of improved searching for cells and system information on the second RAT as demonstrated above. The processing element 508 can also fulfill a multitude of tasks, ranging from signal processing to enable reception and transmission since it is connected to the receiver 504 and transmitter 506, executing applications, controlling the interfaces 510, 512, etc.

The invention claimed is:

1. A method of operating a wireless terminal, the wireless terminal configured to operate in a communication network, the communication network having communication capabilities according to a first radio access technology (RAT) and a second RAT with the wireless terminal, the method comprising the wireless terminal:
transmitting data, via a connection using the first RAT, to a network node of the communication network or connected to the communication network, wherein the data enables the network node to determine information about a position of the wireless terminal;
receiving a set of parameters from the network node via the connection using the first RAT, wherein the set of parameters is related to any of cell search and system information search for the second RAT;
performing cell search or system information search for the second RAT based on the set of parameters received from the network node;
making adaptations to the parameters to succeed in finding a cell or system information to form an adapted set of the parameters; wherein the adapted set of the parameters shares parameters with the set of parameters received from the network node, with at least one shared parameter having a different value in the adapted set of the parameters than in the set of parameters received from the network node; and
thereafter, transmitting the adapted set of the parameters to the network node, wherein the adapted set of the parameters provided success in finding any of the cell or system information.

2. The method of claim 1, wherein the transmitting of data to the network node comprises transmitting positioning information for the wireless terminal.

3. The method of claim 1, wherein the transmitting of data to the network node comprises transmitting arbitrary information, wherein the network node is capable of estimating a position of the wireless terminal from received signals.

4. The method of claim 1, further comprising selecting a subset of the parameters of the set of parameters, the subset of parameters being applicable to the wireless terminal.

5. The method of claim 4, wherein parameters are applicable to the wireless terminal based on any of:
agreement with a subscription associated with the wireless terminal;
access enabled by the wireless terminal; and
capabilities of the wireless terminal.

6. The method of claim 1, wherein the performing cell search is performed based on parameters indicating duration or map of measurements on a cell.

7. The method of claim 1, wherein the parameters indicate any of the following concerning the second RAT:
occupied carriers;
associated RAT;
Public Land Mobile Network code;
bandwidth;
system information location in transmission; and
system information repetition pattern or period in transmission.

8. The method of claim 1, wherein parameters of the adapted set of the parameters indicate any of the following concerning the successful finding of the cell or system information of the second RAT:
occupied carriers;
associated RAT;
Public Land Mobile Network code;
bandwidth;
system information location in transmission; and
system information repetition pattern or period in transmission.

9. A wireless device configured to operate in a communication network, the communication network having communication capabilities according to a first radio access technology (RAT) and a second RAT with the wireless device, the wireless device comprising:
processing circuitry;
memory containing instructions executable by the processing circuitry whereby the wireless device is operative to:
transmit data, via a connection using the first RAT, to a network node of the communication network or connected to the communication network, wherein the data enables the network node to determine information about a position of the wireless device;
receive a set of parameters from the network node via the connection using the first RAT, wherein the set of parameters is related to any of cell search and system information search for the second RAT;
perform cell search or system information search for the second RAT based on the set of parameters;
make adaptations to the parameters to succeed in finding a cell or system information to form an adapted set of the parameters; wherein the adapted set of the parameters shares parameters with the set of parameters received from the network node, with at least one shared parameter having a different value in the adapted set of the parameters than in the set of parameters received from the network node; and
thereafter, transmit the adapted set of the parameters to the network node, wherein the adapted set of the parameters provided success in finding any of the cell or system information.

10. A non-transitory computer readable recording medium storing a computer program product for controlling operation of a wireless device, the wireless device configured to operate in a communication network, the communication network including communication capabilities according to a first radio access technology (RAT) and a second RAT with the wireless device, the computer program product comprising software instructions which, when run on processing circuitry of the wireless device, causes the wireless device to:

transmit data, via a connection using the first RAT, to a network node of the communication network or connected to the communication network, wherein the data enables the network node to determine information about a position of the wireless device;

receive a set of parameters from the network node via the connection using the first RAT, wherein the set of parameters is related to any of cell search and system information search for the second RAT;

perform cell search or system information search for the second RAT based on the set of parameters;

make adaptations to the parameters to succeed in finding a cell or system information to form an adapted set of the parameters; wherein the adapted set of the parameters shares parameters with the set of parameters received from the network node, with at least one shared parameter having a different value in the adapted set of the parameters than in the set of parameters received from the network node; and thereafter, transmit the adapted set of the parameters to the network node, wherein the adapted set of the parameters provided success in finding any of the cell or system information.

* * * * *